Feb. 28, 1939.　　　W. O. MAURER　　　2,149,062

FISHHOOK

Filed Nov. 30, 1937

Inventor
WILLIAM O. MAURER

By Milans & Milans
Attorneys

Patented Feb. 28, 1939

2,149,062

UNITED STATES PATENT OFFICE 2,149,062

FISHHOOK

William O. Maurer, Cincinnati, Ohio, assignor to George H. Hutaff, Jr., Wilmington, N. C.

Application November 30, 1937, Serial No. 177,327

4 Claims. (Cl. 43—89)

My invention relates to new and useful improvements in fishhooks and has for its principal object the provision of oppositely disposed gripping jaws connected at their upper ends by an integral coiled spring which normally urges the lower ends of the jaws having hook portions towards one another, the lower ends of the jaws, when desired, being spaced and held apart by a trip member to which is connected a bait hook, the trip being operated to release the jaws when the bait hook is engaged and pulled on by the fish.

Another object of the invention resides in the formation of one of the jaws so that the trip may be connected thereto for swinging movement, the opposite end of the trip being formed with an eye through which extends one of the jaws, the eye permitting sliding movement of that end of the trip relative to its associated jaw.

A still further object of the invention resides in forming the trip with an eye intermediate the ends thereof, said eye providing means for swingingly connecting the bait hook to the trip.

With the above and other objects in view, which will appear as the description proceeds, my invention consists in the novel details of construction and arrangement of parts, described in the following specification and illustrated in the accompanying drawing, and while I have illustrated and described the preferred embodiments of the invention, as they now appear to me, it will be understood that such changes may be made as will fall within the scope of the appended claims.

Figure 3:
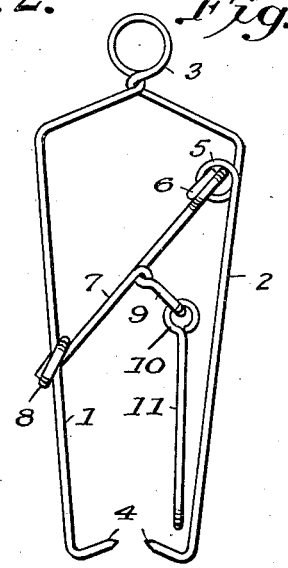
Fig. 3 is a face view showing the jaws in released position.
Figure 4:
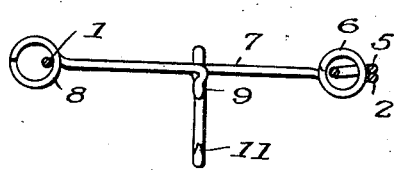
Fig. 4 is a horizontal section on the line 4—4 of Fig. 1 looking downwardly.

In the drawing 1 and 2 illustrate oppositely disposed jaws or shanks connected at their upper ends by means of the integral coiled spring 3 which forms an eye for connecting the line to the hook. Each of the jaws or shanks is formed on its lower end with an inwardly directed hook 4, these hooks being pointed as shown more particularly in Figs. 1 and 3 of the drawing. The jaw or shank 2 is provided, intermediate its ends, with a coiled eye 5 to receive the eye 6 of a trip 7, said trip being formed at its opposite end with an eye 8 through which the jaw or shank 1 extends and intermediate its ends is provided with the eye 9 to receive the eye 10 of the bait hook 11.

It will be understood that by connecting the trip 7 to the jaw or shank 2, through means of the interengaging eyes 5 and 6, the trip may have swinging movement relative to the jaw or shank 2 and when swung the opposite end of the trip will have sliding movement relative to the jaw or shank 1, it being apparent that the shank or jaw 1 normally passes freely through the eye 8, the eye 8 being of greater diameter than the jaw or shank. At the same time the bait hook 11 is swingingly connected to the trip 7 through the inter-engaging eyes 9 and 10.

Figure 1:
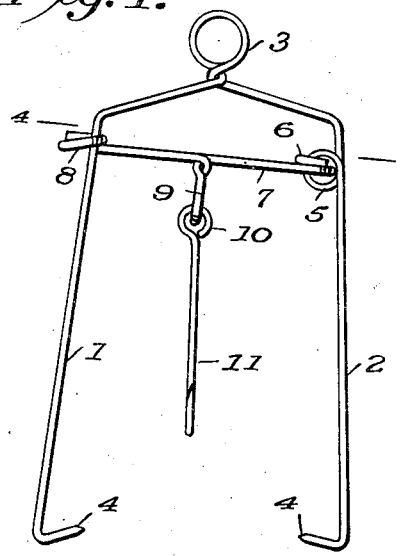
Fig. 1 is a face view showing the jaws in expanded position.
Figure 2:
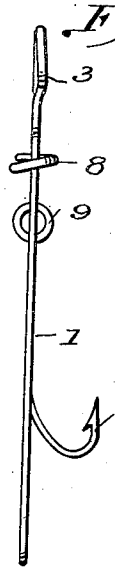
Fig. 2 is an edge view.

In Fig. 1 of the drawing I have shown the trip 7 in substantially horizontal position to spread the jaws or shanks 1 and 2. It will be noted that the eye 8 is positioned a little off center so that the trip will properly hold the jaws spread apart without accidental displacement. When a fish snaps the bait hook 11 it will naturally pull on the line and this pull will draw the end of the trip 7, having the eye 8, downwardly relative to the jaw or shank 1, into the position shown in Fig. 3, and this will permit the jaws or shanks 1 and 2 to spring inwardly to engage the hook portions 4 with the fish.

Figure 5:
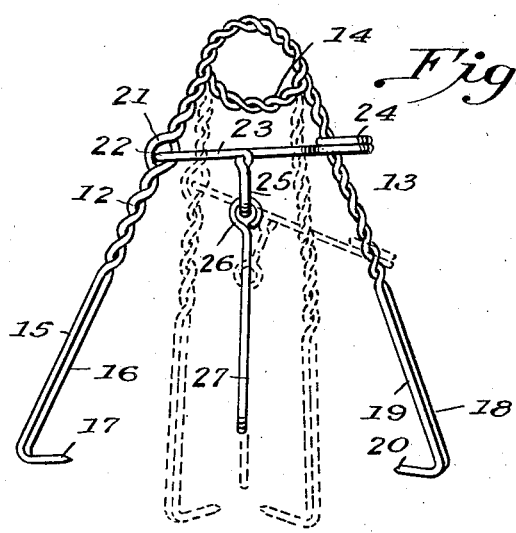
Fig. 5 is a view similar to Fig. 1 showing a slightly modified form of the invention.
Figure 6:
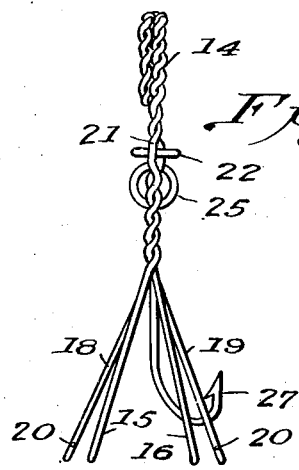
Fig. 6 is an edge view of that form of the invention illustrated in Fig. 5.

In Figs. 5 and 6 I have shown a slightly modified form of my invention in which the jaws or shanks are formed with spaced arms having hook portions. In this modified form of the invention the shanks are indicated at 12 and 13 and the shanks are formed of two strips of wire twisted or wrapped together as shown and connected at their upper ends by the integral coiled spring 14. Below the eyes where the wires are wrapped or twisted together to provide the jaws or shanks, the wires are spread apart to provide on the jaw or shank 12 the spaced arms 15 and 16 having the inwardly directed hook portions 17. The shank or jaw 13 is formed with the spaced arms 18 and 19 provided with the inwardly directed hook portions 20.

The jaw or shank 12, in the wrapped or twisted portion, is formed with the eye 21 to receive the eye 22 of the trip 23, the trip 23 being thus swingingly connected to the jaw or shank 12. At the opposite end the trip 23 is formed with the eye 24, through which extends the jaw or shank 13. Intermediate its ends the trip 23 is formed with the depending eye 25 to receive the eye 26 of the bait hook 27, the interengaging eyes 25 and 26 allowing the bait hook 27 to have swinging movement.

The operation of that form of hook, shown in Figs. 5 and 6, is the same as described for that form of the invention disclosed in Figs. 1 to 4 inclusive. Fig. 5 shows the modified form of the invention with the jaws 12 and 13 spread apart and the trip 23 in substantially horizontal position although the end having the eye 24 is slightly off center or on a slightly higher plane than the opposite end. When the fish grabs the bait hook 27 tension is placed on the line which is connected through the coiled spring 14 and this allows the trip to be released and the jaws to spring inwardly as shown by dotted lines in Fig. 5. The hook portions 17 and 20 of the jaws will engage the fish.

Having fully described my invention what I claim as new and desire to secure by Letters Patent is:

1. A fishhook including oppositely disposed jaws connected by an integral coiled spring, one of said jaws being provided with an eye intermediate its ends, a trip having one end connected to the eye of the jaw and adapted for swinging movement, an eye formed on the opposite end of the trip through which the other jaw passes, and a bait hook connected to the trip.

2. A fishhook including oppositely disposed jaws connected by an integral coiled spring, one of said jaws being formed with an eye intermediate its ends, a trip having one end connected to the eye of the jaw and the opposite end formed with an eye through which the other jaw passes, a depending eye portion formed integral with the trip, and a bait hook connected to the depending eye portion of the trip.

3. A fishhook including oppositely disposed jaws connected by an integral coiled spring, one of said jaws being formed with an eye intermediate its ends, a trip being formed with an eye at one end to be interengaged with the eye of the jaw, an eye formed on the opposite end of the trip and through which the other jaw passes, a depending eye portion formed intermediate the ends of the trip, and a bait hook connected to the depending eye portion of the trip.

4. A fishhook including oppositely disposed jaws having a normal tendency to come together, one of said jaws being provided with an eye intermediate its ends, a trip adapted for spreading the jaws from their normal position and holding the same in said spread position until released, said trip having one end connected to the eye of the jaw and adapted for swinging movement, an eye formed on the opposite end of the trip through which the other jaw passes, and a bait hook connected to the trip, said trip being released by a pulling movement on the bait hook.

WILLIAM O. MAURER.